US011047125B2

(12) United States Patent
Underwood

(10) Patent No.: US 11,047,125 B2
(45) Date of Patent: Jun. 29, 2021

(54) REGENERATIVE STORMWATER CONVEYANCE SYSTEM AND METHOD

(76) Inventor: Keith R. Underwood, Annapols, MD (US)

( * ) Notice: Subject to any disclaimer, the term of this patent is extended or adjusted under 35 U.S.C. 154(b) by 570 days.

(21) Appl. No.: 12/292,642

(22) Filed: Nov. 21, 2008

(65) Prior Publication Data
US 2009/0290936 A1    Nov. 26, 2009

Related U.S. Application Data

(63) Continuation-in-part of application No. 11/482,891, filed on Jul. 10, 2006.

(60) Provisional application No. 60/697,390, filed on Jul. 8, 2005, provisional application No. 60/996,519, filed on Nov. 21, 2007.

(51) Int. Cl.
*E03F 1/00* (2006.01)
*C02F 1/00* (2006.01)
*C02F 103/00* (2006.01)

(52) U.S. Cl.
CPC .............. *E03F 1/002* (2013.01); *C02F 1/001* (2013.01); *C02F 2103/001* (2013.01); *Y02A 10/30* (2018.01); *Y02A 20/40* (2018.01)

(58) Field of Classification Search
CPC ......... E03F 1/00; C02F 2103/001; E02B 3/00
USPC ......... 405/52, 53, 55, 80, 87, 107, 116, 118, 405/119; 210/747, 170.01
See application file for complete search history.

(56) References Cited

U.S. PATENT DOCUMENTS

| | | | | |
|---|---|---|---|---|
| 4,876,004 A * | 10/1989 | Verhoeff | ................... | 210/170.08 |
| 5,322,629 A * | 6/1994 | Stewart | ........................ | 210/767 |
| 7,037,423 B2 * | 5/2006 | Herman et al. | ............... | 210/151 |
| 2001/0045383 A1 * | 11/2001 | Coffman | ....................... | 210/150 |
| 2002/0187006 A1 * | 12/2002 | Burns, II | ........................ | 405/81 |
| 2008/0197073 A1 * | 8/2008 | Jacquet | ........................ | 210/602 |

OTHER PUBLICATIONS

Georgia Stormwater Management Manual, vol. 2, Technical Handbook, Aug. 2001, first edition.*
Atlantic White Cedar: Ecology, Restoration, and Management. Proceedings of the Arlington Echo Symposium, Millersville, Maryland, Jun. 2003, USDA Forest Service GTR-SRS-91.*

(Continued)

Primary Examiner — Tara Mayo-Pinnock
(74) Attorney, Agent, or Firm — Michael Best & Friedrich LLP

(57) ABSTRACT

A regenerative stormwater conveyance (RSC) system for treating and dispersing stormwater runoff is disclosed which includes an upstream entry point where water enters the system and an entry pool downstream from the entry point that collects water from the entry point. The RSC system includes one or more shallow aquatic beds that receive water from the entry pool in a serial manner and each of which includes a filtration structure for filtering water from the aquatic bed. Riffle weir grade control structures are positioned between the aquatic beds and transition water overflowing from each upstream aquatic bed to a downstream aquatic bed. Accordingly, collected stormwater runoff traverses the series of aquatic beds and riffle weir grading structures and is treated and detained, thus, conveying stormwater to groundwater through infiltration.

18 Claims, 15 Drawing Sheets

(56) References Cited

OTHER PUBLICATIONS

R. Newbury, M. Gaboury, The Use of Natural Stream Characteristics for Stream Rehabilitation Works Below the Manitoba Escarpment, Canadian Water Resources Journal. 13 (1988) 35-51. doi:10.4296/cwrj1304035. (Year: 1988).*
J. Powder, Tree Revival Takes Root in Arundel, The Baltimore Sun. (2001). (Year: 2001).*
S. Babakaiff, D. Hay, C. Fromuth, Rehabilitating Stream Banks, Fish Habitat Rehabilitation Procedures. 9 (1997) 94-116. (Year: 1997).*
S. McKerrow, ed., Shipley's Choice Elementary School, The Severn River Log. 92 (2002) 6. (Year: 2002).*
Fahrenthold, David. "Refreshing the Bay by Restoring Bogs" Washington Post, Nov. 11, 2004, p. AA14. (Year: 2004).*
Powder, Jackie. "Arundel Project Seeks Wildlife''s Return to Stream" Baltimore Sun, Dec. 30, 2001, p. 166. (Year: 2001).*

* cited by examiner

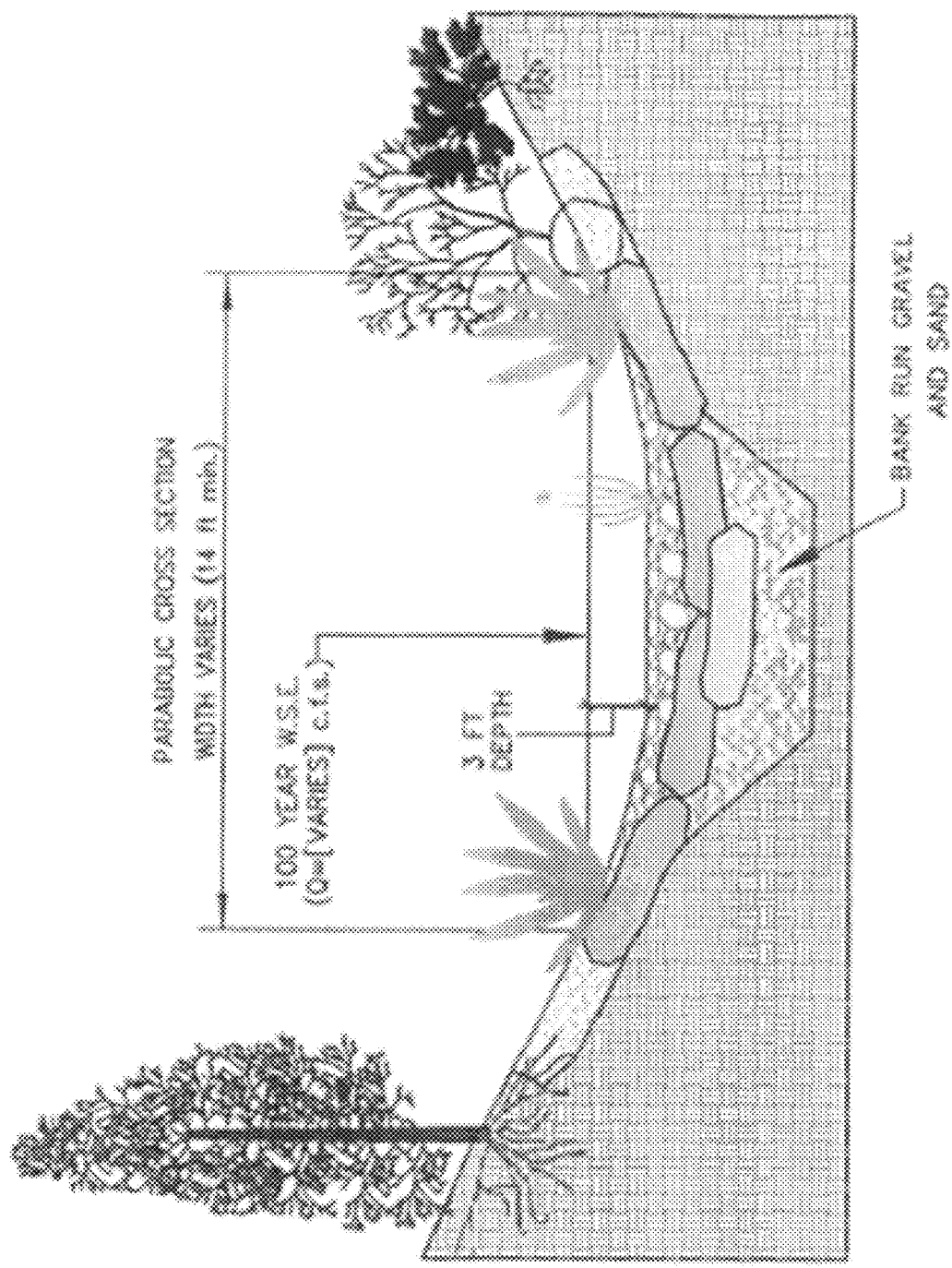

REGENERATIVE STORMWATER CONVEYANCE SYSTEM AND METHOD

CROSS REFERENCE TO RELATED APPLICATIONS

This application is an application filed under 35 U.S.C. § 111(a) claiming benefit pursuant to 35 U.S.C. § 119(e)(1) of the filing date of Provisional Application Ser. No. 60/996, 519 filed on Nov. 21, 2007 pursuant to 35 U.S.C. § 111(b) and, further, this application is a continuation-in-part application claiming the benefit pursuant to 35 U.S.C. § 120 of pending U.S. Non-Provisional application Ser. No. 11/482, 891 filed Jul. 10, 2006, which claims the benefit of the filing date of Provisional Application Ser. No. 60/697,390 filed Jul. 8, 2005. The contents of all applications identified above are incorporated herein by reference in their entirety for all that is disclosed.

FIELD OF THE INVENTION

This invention relates generally to a system and method for treating and safely detaining and conveying stormwater to groundwater through infiltration. Additionally, systems and methods in accordance with the present invention can be combined with other systems for creating and restoring stream and wetland habitats that can sustain particular indigenous and transplanted animal and plant life. More particularly, the present invention relates to a method and system referred to throughout this specification as a Regenerative Stormwater Conveyance system and method that include open-channel, sand-seepage filtering that utilizes a series of shallow aquatic pools, riffle weir grade controls, native vegetation and underlying sand channel for treating and safely detaining and conveying stormwater to groundwater through infiltration.

BACKGROUND OF THE INVENTION

Many streams, creeks, rivers and other inland waterways, particularly those in urbanized environments, have been significantly degraded over the course of the last one hundred years. More particularly, increased areas of impervious surface, such as roads, parking lots, and rooftops, have reduced the base flow of these waterways, resulting in lowered water tables and 'flashier' streams with more erratic flows. This causes the waterways to convey dramatically smaller volumes and velocities of water under base flow conditions than the same waterways would convey after precipitation events.

The increase in stormwater volume, in conjunction with an increase in water flow velocity, have cut into and increased stream channel depths, (i.e., reduced inverts) leaving vertical banks, eroded stream channels and a reduction in groundwater table elevations, thus, exacerbating the problem. Specifically, the erosion creates depositional features downstream, destroying ecosystems and creating navigational hazards which, in some cases, results in the need for dredging. To put this in perspective, for each ton of deposition in the channel, seven tons of bank erosion can be expected to have occurred. This, in turn, sets up the habitat for a disturbance regime of invasive and low quality plants, such as, phragmites and cut grass. Additionally, when the silt is released into peatlands, a transition of the bog habitats results, leading to a 'common' disturbance-tolerant plant community, rotting peat, and the release of additional nutrients.

In related art methods of addressing the above issues, stormwater is diverted from impervious surfaces into streams and rivers in a manner that transfers the water from the impervious surfaces to the waterways as quickly as possible. This approach generally involves either piping the water into outfalls or directing it down concrete lined channels directly into the waterways. These conventional methods have caused untold erosion and destruction to streams, creeks, and rivers.

During the last twenty years or so, the work of Dr. David Rosgen, a hydrologist from Colorado, has been recognized as being at the forefront of much of the "stream restoration" efforts taking place in the United States. The so-called Rosgen Methods consist largely of 're-sizing' and aligning the stream channel to safely convey water and sediment through the project reach. This is typically accomplished by enlarging or reducing the channel cross section, raising or lowering the channel invert, stabilizing stream banks through grading and/or hardening them with rock, root wads, and bioengineering practices, such as, soil wraps, live branch layering, etc., and directing the stream's thalweg, i.e., the line defining the lowest points along the length of a river bed, through riffles and pools using various structures, such as, rock vanes, etc., to accommodate the bank-full discharge (e.g., the "one and a half year storm event").

The related art methods described above can be used to accomplish reconnection of the stream with its floodplain through raising the channel's invert, excavating the floodplain, or other techniques. The key benefits of these systems are that they provide bank stabilization and result in reduced generation of in-channel sediment by re-establishing stream competence as a result of hardening the channel with rip-rap, logs, or other rigid material, thus preventing erosion of the channel.

One problem with related art methods, however, is that many designers often fail to pay attention to site conditions and instead work from 'cookbook' recommendations or past project experience and knowledge. These 'cookbook' recommendations often either fail to account for individual variations in the site, or are based on inappropriate reference sites. For instance, the Rosgen methods were developed in mountainous western United States and are not based on urban hydrology. Conventionally-designed projects provide little to no water quality treatment benefit. They allow the sediment that enters the system to quickly leave the system, ideally, in a manner that does not convey any additional sediment from the project area.

Many of these related art projects are constructed without regard for materials native to the project site. For instance, traditional materials often used in the coastal plains region of the United States, e.g., limestone rip-rap, raises pH levels and discharges calcium and manganese into historically nutrient poor environments, further disrupting the flora and fauna of the area. This approach does not work well in urbanized coastal plains regions where sediments transferred include pollutants that are discharged into coastal bays; pollutants such as mercury and lead that were historically sequestered in peatlands at the headwater streams in the coastal plains. Destruction of these ecosystems has removed the peat "sponge" that typically absorbed these pollutants and resulted in a release of mercury and other heavy metals as a result of the rotting of the peat.

It is, thus, desirable to provide a system and method of efficiently and effectively treating and storing stormwater runoff in an environmentally friendly and aesthetically pleasing manner that avoids the problematic issues described above and is capable of accepting urban, as well as naturally occurring, stormwater run-off to further provide an environment where indigenous as well as transplanted plant life can thrive. It is further desired to provide a system that is more effective at stabilizing eroding outfalls and otherwise unstable stream systems than systems currently employed.

SUMMARY OF THE INVENTION

In view of the aforementioned problems with the conventional approach to efficient and effective stormwater treatment systems and methods, the present invention, herein generally referred to as a system and method of Regenerative Stormwater Conveyance (RSC), is provided.

An RSC system in accordance with the present invention are open-channel, sand seepage filtering systems that utilize a series of shallow aquatic pools, riffle weir grade controls, native vegetation, and underlying sand channel to treat and safely detain and convey storm flow, and convert stormwater to groundwater through infiltration. RSC systems combine features and treatment benefits of swales, infiltration, filtering, and wetland practices. In addition, they are designed to convey flows associated with the extreme floods (i.e., 100-year return frequency event) in a non-erosive manner, which results in a reduction of channel erosion impacts from those commonly seen between stormwater practice outfalls and ultimate receiving waters.

An RSC system and method in accordance with the present invention operates to stabilize eroding outfalls and otherwise unstable stream systems in a more effective manner than other systems currently in use. Designing and constructing an RSC system in accordance with the present invention is effective at meeting many or all of the unified sizing criteria, depending on site specifics.

Specifically, RSC systems combine features and treatment benefits of swales, infiltration, filtering, and wetland practices. Therefore, RSC systems according to the present invention perform equally as well, if not better, than currently accepted water quality and recharge practices. In addition, they are designed to convey flows associated with events up to and including the extreme floods (i.e., 100-year return frequency event) in a non-erosive manner, which results in reduced channel erosion impacts commonly seen between stormwater practice outfalls and ultimate receiving waters.

Due to the ability to safely convey larger flows, RSC systems do not require flow splitters to divert smaller events to them for treatment. As part of the conveyance system, they also reduce the need for storm drain infrastructure. Finally, RSC systems have the added benefit of providing dynamic and diverse ecosystems for a range of plants, animals, amphibians, and insects. These ecosystems enhance pollutant uptake and assimilation and provide a natural and native aesthetic to sites at which they are installed.

RSC systems according to the present invention can be located on the front and/or tail end of a treatment system and still provide water quality and groundwater recharge benefits. Where located on the front end of a treatment train, they provide water quality, groundwater re-charge, and channel protection treatment while also providing non-erosive flow conveyance that delivers flows to the stormwater quantity control practice—a constructed wetland.

The physical modifications necessary to establish the sand seepage hydrology associated with an RSC system require the creation of a series of well vegetated stilling pools, sand seepage beds replete with above and below-ground biomass, and associated flow paths through low areas dominated by native wetland plants.

The physical effect of the pools and their many plant stems is to reduce water velocity and facilitate removal of suspended particles and their associated nutrients and/or contaminants. Uptake of dissolved nutrients and adsorption of oils and greases by the many plant stems present in the pools yields additional benefits.

The cobble weirs set the surface water elevations and establish the hydraulic head necessary to drive the sand seepage system and support the plants. In addition, the sand seepage bed supports microbes, fungi, macro invertebrates, and processes which remove nutrients and contaminants as they pass through the sand bed. Furthermore, the many roots present in the sand take up nutrients and provide sites for microbial attachment, contaminant adsorption, and long-term sequestration in the peat forming layer resulting from annual root formation of the fibric root mat.

The materials used to achieve these results are, to the extent possible, taken from the coastal plain. Bank-run gravel and sand are quarried throughout the region and can be readily obtained. The only large stone found in the coastal plain is sandstone (e.g., bog iron, ferracrete). The porosity of sandstone, as well as its ability to retain water, allows it to naturalize quickly, providing habitat for ferns, moss, and other organisms that persist in these systems.

While the design and construction of an RSC system in accordance with the present invention provides added structural stability via stone and sand to eroded ravines or outfall areas expecting increased flows, vegetative material planted along the channel and in the bottoms of pools provides an important contribution to project sustainability by tying the system together and increasing the porosity of the pools. Once established, an RSC system in accordance with the present invention restores the ecologies of Eastern Forest Floor systems and is self-maintaining.

According to one aspect of the present invention a regenerative stormwater conveyance system for treating and dispersing stormwater runoff is provided which includes an upstream entry point, e.g., a point from which water flows, where water enters the system and an entry pool downstream from the entry point that collects water from the entry point. A system according to this embodiment further includes a shallow aquatic bed which includes a filtration structure for filtering water from the first aquatic bed, and a first riffle weir grade control structure that transitions water overflowing from the entry pool into the shallow aquatic bed, wherein the water level in the aquatic bed is lower than the water level in the entry pool.

According to another aspect of the present invention a method for constructing a regenerative stormwater conveyance system is provided including determining the volume of water for storage, mapping out the reach where the RSC will be placed in the landscape, determining the length of the reach from an input point to a discharge point, determining the elevation difference of the reach as the difference between the top of the reach and the bottom of the reach and setting a number of riffle weir grade control structures to be constructed in the system to the elevation difference of the reach.

BRIEF DESCRIPTION OF THE DRAWINGS

The object and features of the present invention will become more readily apparent from the following detailed description of the exemplary embodiments taken in conjunction with the accompanying drawings in which:

FIG. 5A is a cross section elevation front view of an exemplary embodiment of a riffle weir used in a regenerative stormwater conveyance system in accordance with the present invention.

DETAILED DESCRIPTION OF EXEMPLARY EMBODIMENTS

Figure 1A:
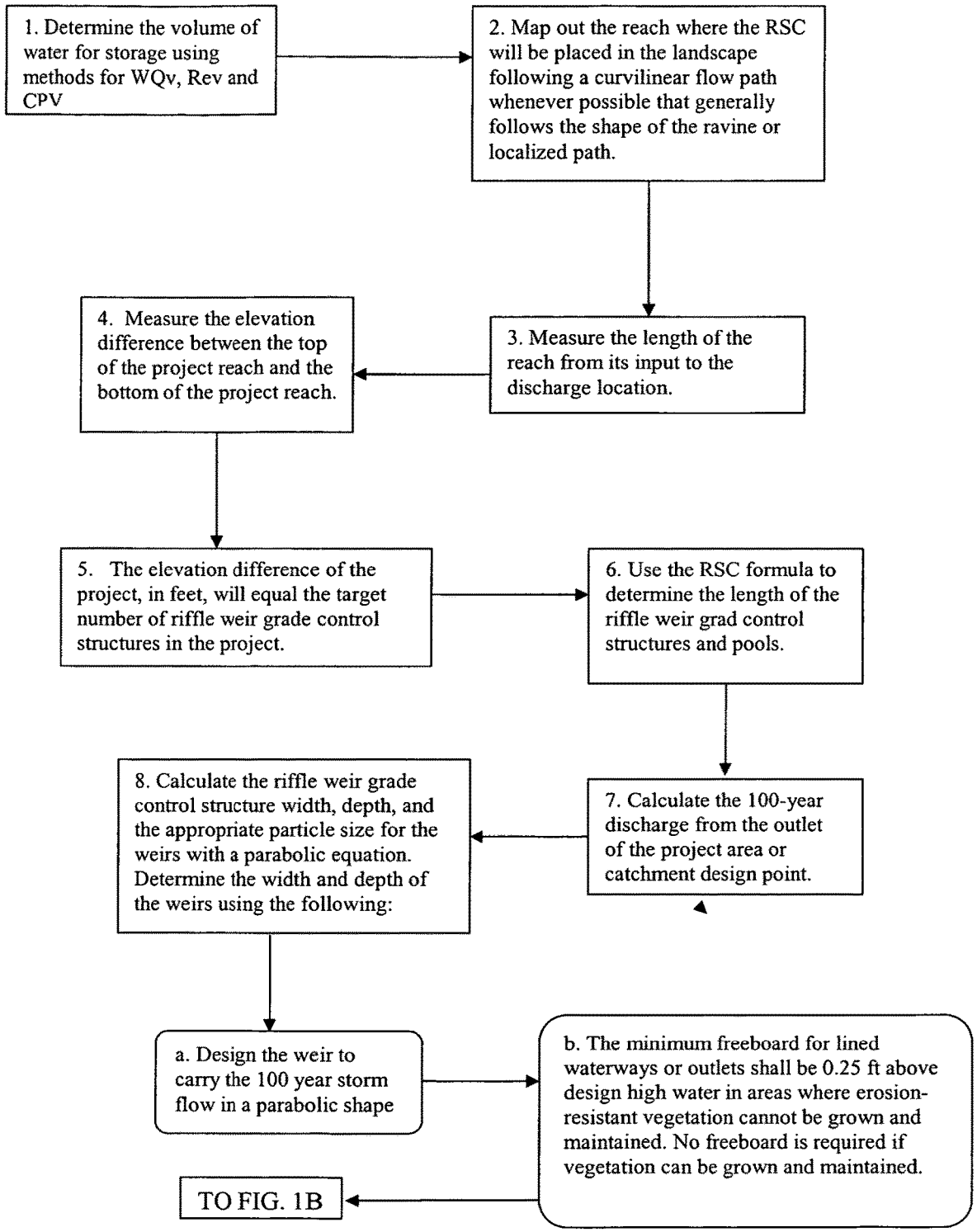
FIGS. 1A-1C is a flow diagram showing the steps used to construct a regenerative stormwater conveyance system in accordance with the present invention.

Exemplary embodiments of the present invention are discussed in detail below. While specific configurations are discussed, it should be understood that this is done for illustration purposes only. A person skilled in the relevant art will recognize that other components and configurations may be used without departing from the spirit and scope of the invention.

Before describing exemplary, non-limiting embodiments in accordance with the present invention, a number of terms are defined to assist the reader. The terms defined are components of a seepage wetland system in accordance with the present invention.

Primary seepage reservoir—water reservoir designed to irrigate porous media (sand or gravel), spread water out along the outer regions of a project site to detain the first flush of stormwater into a project site at the highest elevation possible on the given site.

Seepage Reservoirs—Sand berms are placed in appropriate positions in the landscape to capture surface and/or groundwater.

Sand Berm seepage wetland—A berm of sand designed to contain a seepage reservoir filter and exfiltrate water stored in a seepage reservoir and support plant growth, microbes, algae, fungi and macro-invertebrates.

Sand berm level spreader—A berm of sand designed to spread stormwater across a broad area to dissipate erosive energies and support plant growth and populations of microbes, algae, fungi and macro-invertebrates.

Sand seepage bed—A bed of sand is placed in the drainage way (e.g. eroded ravine) and Riffle weirs grade control structures and pools form the new surface topography over top of the sand bed. This allows some water to filter under the surface and exfiltrate as a seep.

Primary Riffle weir grade control structure—sets water surface elevation in a primary seepage reservoir at the highest grade possible on a given site, higher than receiving body of water e.g. adjacent Wetland pool or stream Channel.

Riffle weir grade control structures—a grade control structure comprised of boulders and gravel that concentrates low water flow in a stream or water coarse and spreads stormwater out to sheet flow, raise stream inverts to allow stormwater access to flood plains or impound shallow water.

Created aquacludes—Clay lens or other impervious layer installed below porous soil (sand or gravel bed) to direct water through porous soils.

Shallow aquatic beds—pools created with the placement of a riffle weir grade control structure in a water course.

Peatland vegetation—The systems can be designed to support peat forming vegetation and accumulate peat. Appropriate native plant species such as Atlantic White Cedar, sphagnum, nymphaea and cranberry can be planted in appropriate zones of project sites designed with these methods to accrete peat. This can result in carbon storage, improved water quality, endangered species recovery sites.

In accordance with a first exemplary embodiment of the present invention, an RSC system is provided that consists of weirs and pools. The pools are sized to provide storage of some portion or all of the WQV, Rev and for the CPV. According to a further aspect of this embodiment, if the pools provided cannot easily provide full control they can be used in conjunction with other BMPS. It is important to remember and acknowledge that each site has unique and defining features that require site-specific design and analysis. The guidance provided below is intended to assist in the design process but is not a "cookie cutter" approach. Those seeking to design and produce a system in accordance with the present invention need to be familiar with the hydrologic and hydraulic principles that are the foundation of the design.

For example, the design of a system according to the present embodiment is based on safe conveyance of the 100 year runoff. Water quality, recharge, and channel protection treatment and storage volumes are accommodated within this 100 year return frequency design framework.

Figure 1B:
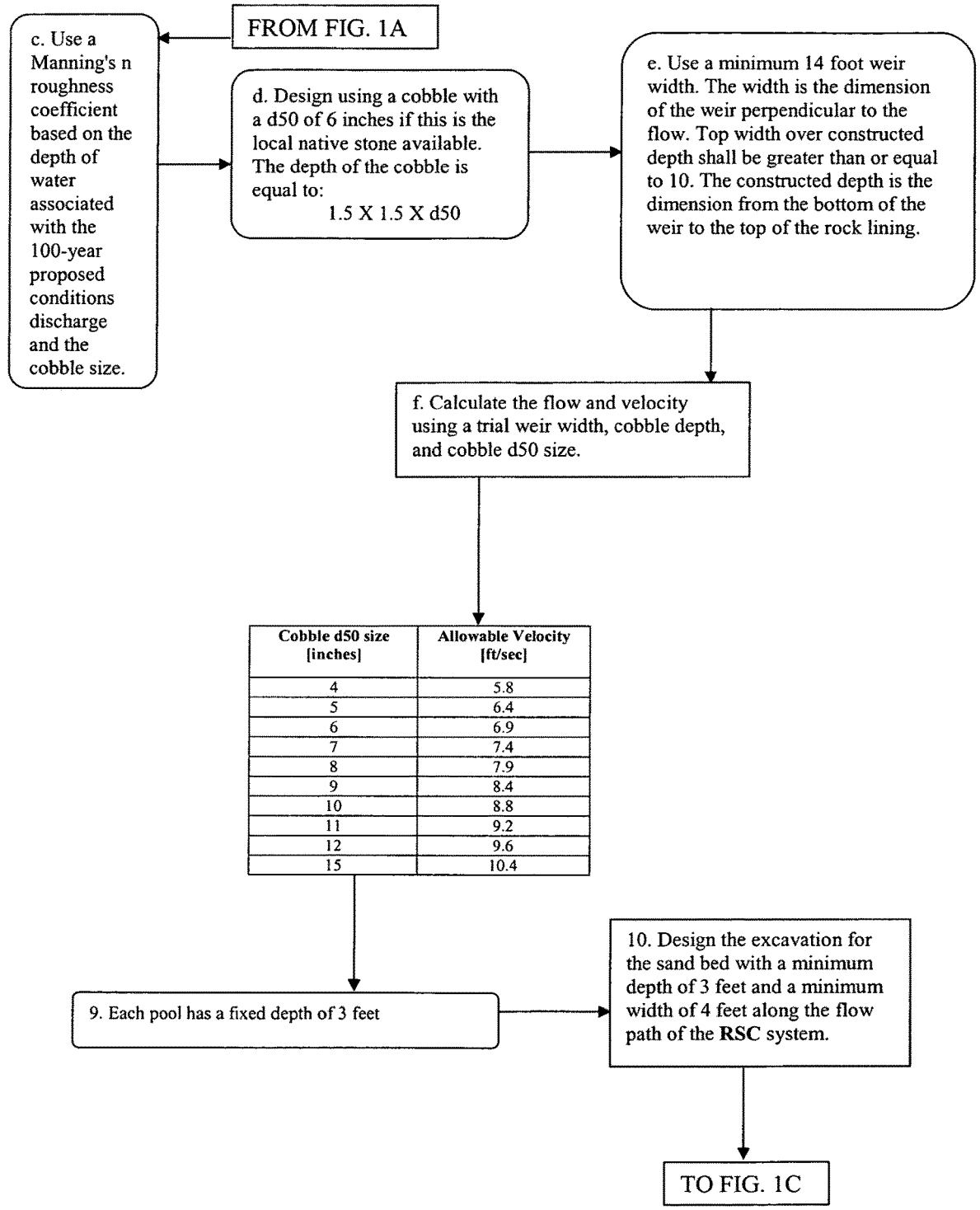
Figure 1C:
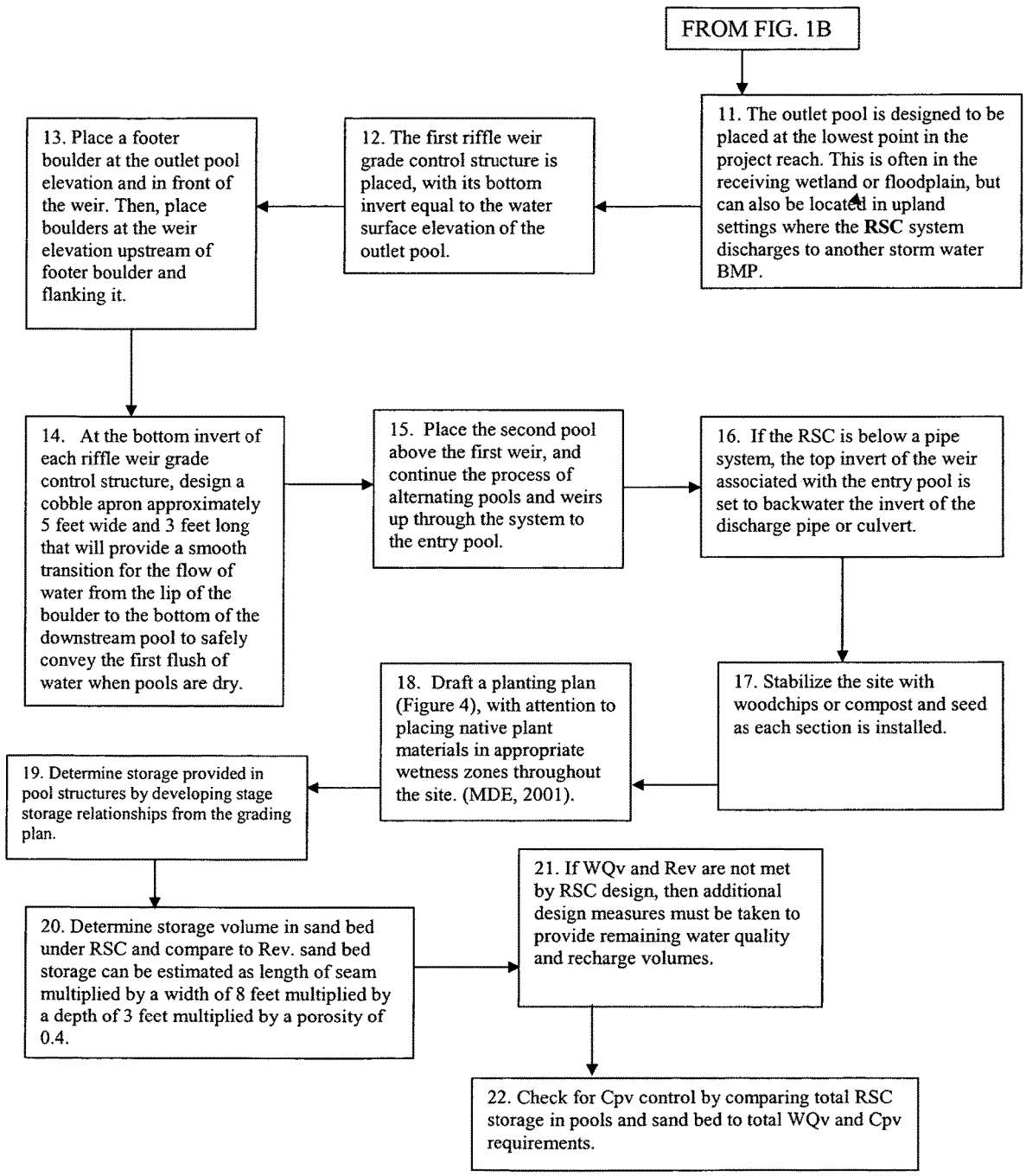

A method for designing a RSC system in accordance with the present embodiment will now be discussed in reference to FIG. 1.

1. Determine the volume of water for storage using the methods for WQv, Rev and/or CPV. Those having skill in the art understand how to calculate this value.

2. Map out the reach where the RSC will be placed in the landscape following a curvilinear flow path whenever possible that generally follows the shape of a ravine or localized drainage path.

3. Measure the length of the reach from its input to the discharge location.

4. Measure the elevation difference between the top of the project reach and the bottom of the project reach.

5. The elevation difference of the project, in feet, is equal to the target number of riffle weir grade control structures in the project. In general, each of the riffle weir grade control structures should be designed to drop one foot along its length. The construction of a riffle weir grade control structure is described in more detail below.

6. Use the RSC formula below to determine the length of the riffle weir grade control structures and pools.

$$((\text{Length of reach})/(\text{Elevation difference}))/2 = \text{Length of weir} = \text{Length of pool}$$

If the result of the RSC formula is less than 10, the site may require one or more cascades to traverse the grade.

Length of weir=dimension of weir in direction of flow

7. Calculate the 100-year discharge from the outlet of the project area or catchment design point.

8. Calculate the riffle weir grade control structure width, depth, and the appropriate particle size for the weirs with a parabolic equation. Determine the width and depth of the weirs using the following:
   a. Design the weir to carry the 100 year storm flow in a parabolic shape.
   b. The minimum freeboard for lined waterways or outlets shall be 0.25 ft above design high water in areas where erosion-resistant vegetation cannot be grown and maintained. No freeboard is required if vegetation can be grown and maintained.
   c. Use a minimum 14 foot weir width. The width is the dimension of the weir perpendicular to the flow. Top width over constructed depth shall be greater than or equal to 10. The constructed depth is the dimension from the bottom of the weir to the top of the rock lining. (See FIG. 2A).
   d. Design using a cobble with a d50 of 6 inches if this is the local native stone available. The depth of the cobble is equal to:

$$1.5 \times 1.5 \times d50$$

e. Use a "Manning's" roughness coefficient, n, based on the depth of water associated with the 100-year proposed conditions discharge and the cobble size:

$$n = d^{1/6}(21.6 \log(d/d50) + 14), \quad \text{(Eq. 1)}$$

Where:
d=depth, ft.
d50=cobble size, ft.

f. Calculate the flow, Q, and velocity using a trial weir width, cobble depth, and cobble d50 size.

$$Q = (1.49111)(A)(Rh)^{2/3}(S)^{1/2} \quad \text{(Eq 2)}$$

Where:
Q=flow (cfs)
1.49=conversion factor
n=Manning's n, determined by Eq 1
A=Area, which for a parabola=⅔(T)(y),
where:
   T is top width (ft) and y is depth (ft)
   Rh=hydraulic radius (ft), which for a parabola=$[2(T)^2(y)]/[3(T)^2 + 8(y)^2]$ S=slope (ft/ft)

According to this embodiment, the flow meets or exceeds the 100 year flow and the velocity is below the maximum allowable velocity. For example, maximum allowable velocities are shown in Table 1 below, the values of which are derived from the Ishbash curve in accordance with methods known to those of skill in the art. This will be an iterative design process.

TABLE 1

| Cobble d50 size [inches] | Allowable Velocity [ft/sec] |
| --- | --- |
| 4 | 5.8 |
| 5 | 6.4 |
| 6 | 6.9 |
| 7 | 7.4 |
| 8 | 7.9 |
| 9 | 8.4 |
| 10 | 8.8 |
| 11 | 9.2 |
| 12 | 9.6 |
| 15 | 10.4 |

9. Each pool has a fixed depth of 3 feet.

10. Design the excavation for the sand bed with a minimum depth of 3 feet and a minimum width of 4 feet along the flow path of the RSC system.

11. The outlet pool is designed to be placed at the lowest point in the project reach. This is often in the receiving wetland or floodplain, but can also be located in upland settings where the RSC system discharges to another stormwater BMP.

12. Next, the first riffle weir grade control structure is placed, with its bottom invert equal to the water surface elevation of the outlet pool. This weir will rise 1 foot over its length, and its top invert will be 1 foot above the invert of the outlet pool, and will set the water surface elevation of the next upstream pool.

13. Place a footer boulder at the outlet pool elevation and in front of the weir. Then, place boulders at the weir elevation upstream of footer boulder and flanking it.

14. At the bottom invert of each riffle weir grade control structure, design a cobble apron approximately 5 feet wide and 3 feet long that will provide a smooth transition for the flow of water from the lip of the boulder to the bottom of the downstream pool to safely convey the first flush of water when pools are dry.

15. Place the second pool above the first weir, and continue the process of alternating pools and weirs up through the system to the entry pool.

16. If the RSC is below a pipe system, the top invert of the weir associated with the entry pool is set to backwater the invert of the discharge pipe or culvert.

17. Stabilize the site with woodchips or compost and seed as each section is installed. Place coarse, woody debris in pools as each section is completed. Place stabilization, seeding and top dressing notes on the plans and require labor to be on-site for the duration of the project installation.

18. Draft a planting plan (FIG. 4), with attention to placing native plant materials in appropriate wetness zones throughout the site.

19. Determine storage provided in pool structures by developing stage storage relationships from the grading plan. As an initial design estimate, storage volume can be determined by multiplying the surface area (determined through planimeter or computer measurement) by maximum pool depth of 3 feet and then by a scaling factor of 0.4. Compare this storage versus WQv to determine if adequate. The storage volume, V, in cubic feet, is calculated as follows:

$$V = (SA)(\max d)(0.4)$$

Where:
SA=surface area (square feet)
max d=maximum depth (ft)–recommended pool depth for RSC system is 3' (ft.).
0.4=scaling factor to account for prismoid volume of storage pool.

20. Determine storage volume in sand bed, Vsb, under RSC and compare to Rev. sand bed storage can be estimated as length of seam multiplied by a width of 8 feet multiplied by a depth of 3 feet multiplied by a porosity of 0.4. Compare this storage versus Rev to determine if adequate.

$$Vsb = (L)(w)(d)(0.4)$$

Where:
Vsb=sand bed storage volume (cubic feet)
L=Length of sand bed (feet)
w=width of sand bed (feet)–recommended design width is 8 feet.
d=depth of sand bed (feet)–recommended design depth is 3 feet.
0.4=porosity of sand 21. If WQv and Rev are not met by RSC design, then additional design measures must be taken to provide remaining water quality and recharge volumes.

22. Check for Cpv control by comparing total RSC storage in pools and sand bed to total WQv and Cpv requirements. Where total RSC storage exceeds the combined WQv and Cpv requirements these criteria are fully met by the RSC system. Where full storage is not achieved, compute the peak discharge associated with the Cpv criteria and analyze discharge and associated velocities at downstream RSC weir structure using parabolic weir formula. Where velocities are shown to be 3 feet per second or less, no additional Cpv control is required. Where velocities are greater than 3 feet per second, additional Cpv storage is required at other locations in the catchment.

A regenerative stormwater conveyance system (RSC) and its constituent components in accordance with an exemplary embodiment will now be described referring to FIGS. 2-10. In FIGS. 2-10 the same reference numbers are used to refer to similar structure(s), as described.

Figure 2A:
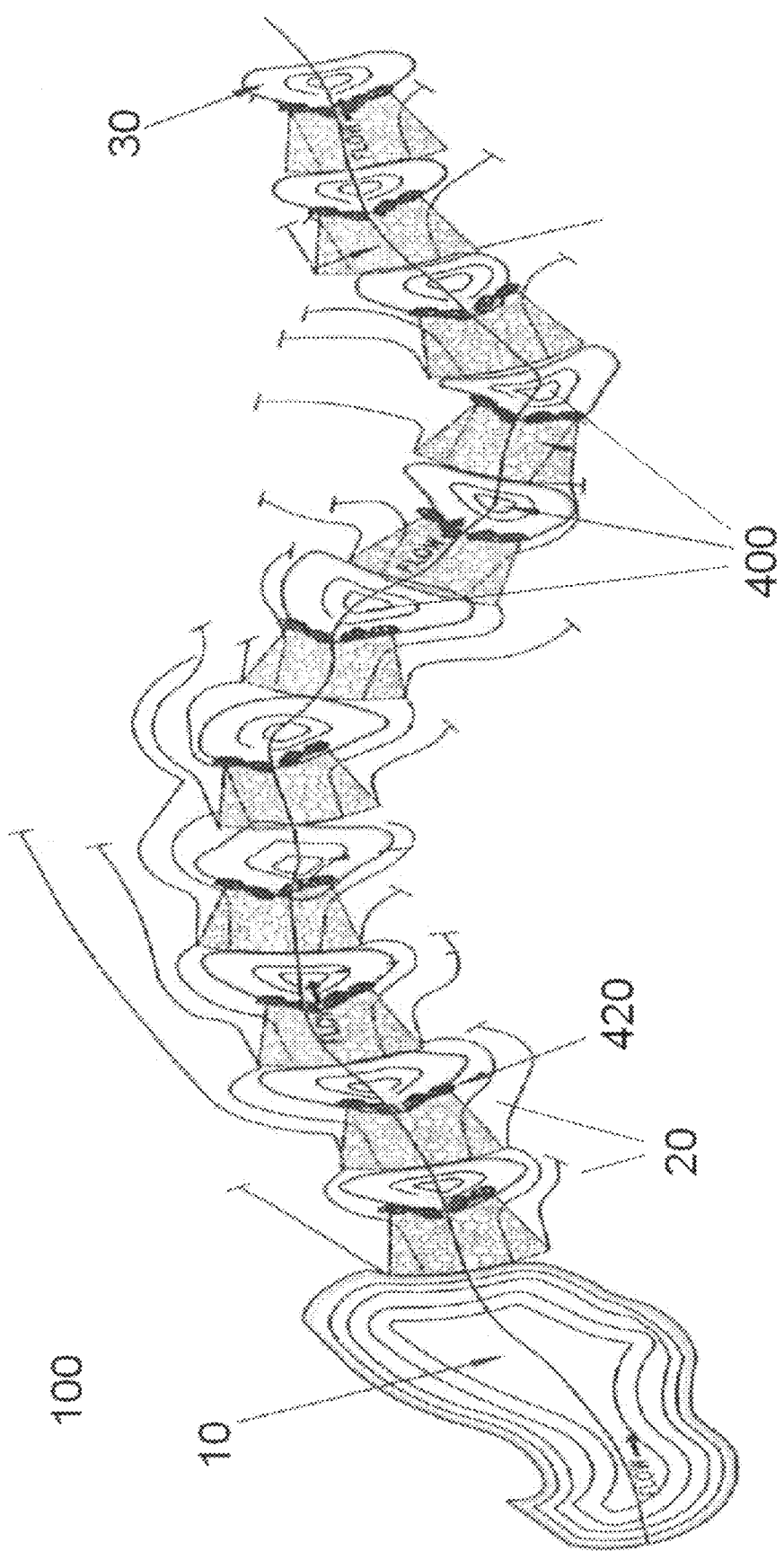
FIG. 2A is a top view of a regenerative stormwater conveyance system in accordance with one exemplary embodiment of the present invention.
Figure 2B:
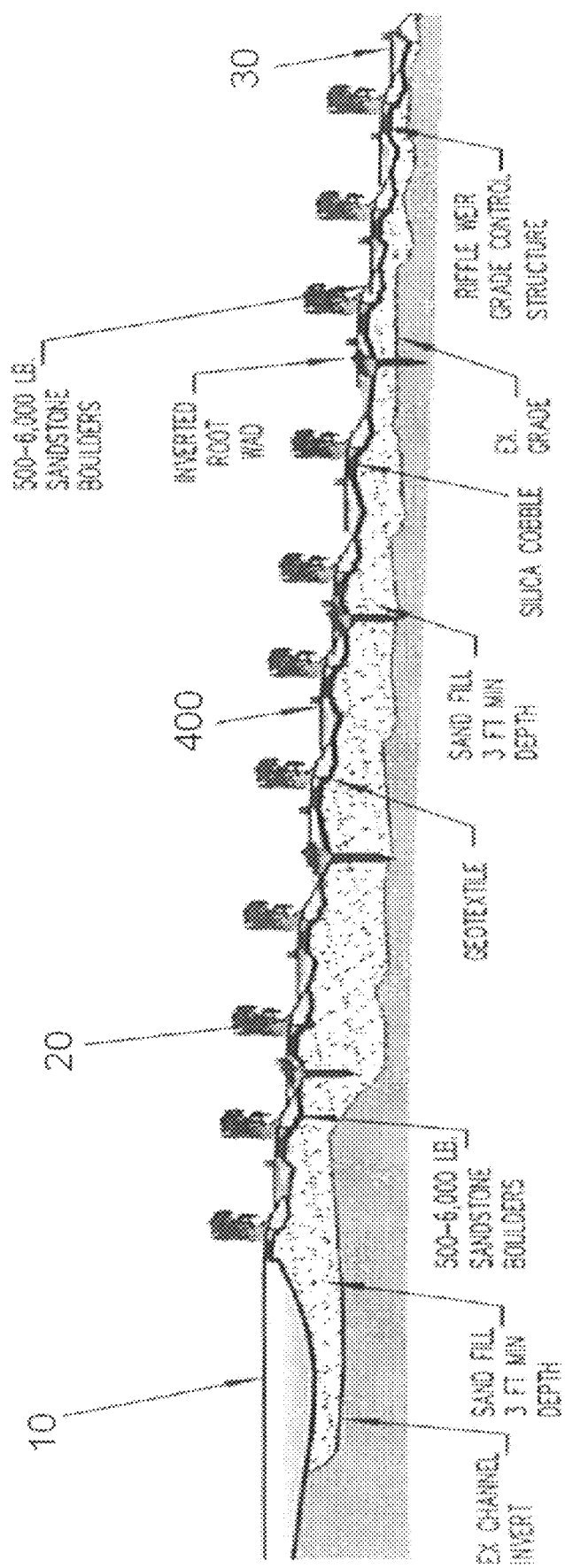
FIG. 2B is a side view of the regenerative stormwater conveyance system of FIG. 2A in accordance with the present invention.
Figure 3:
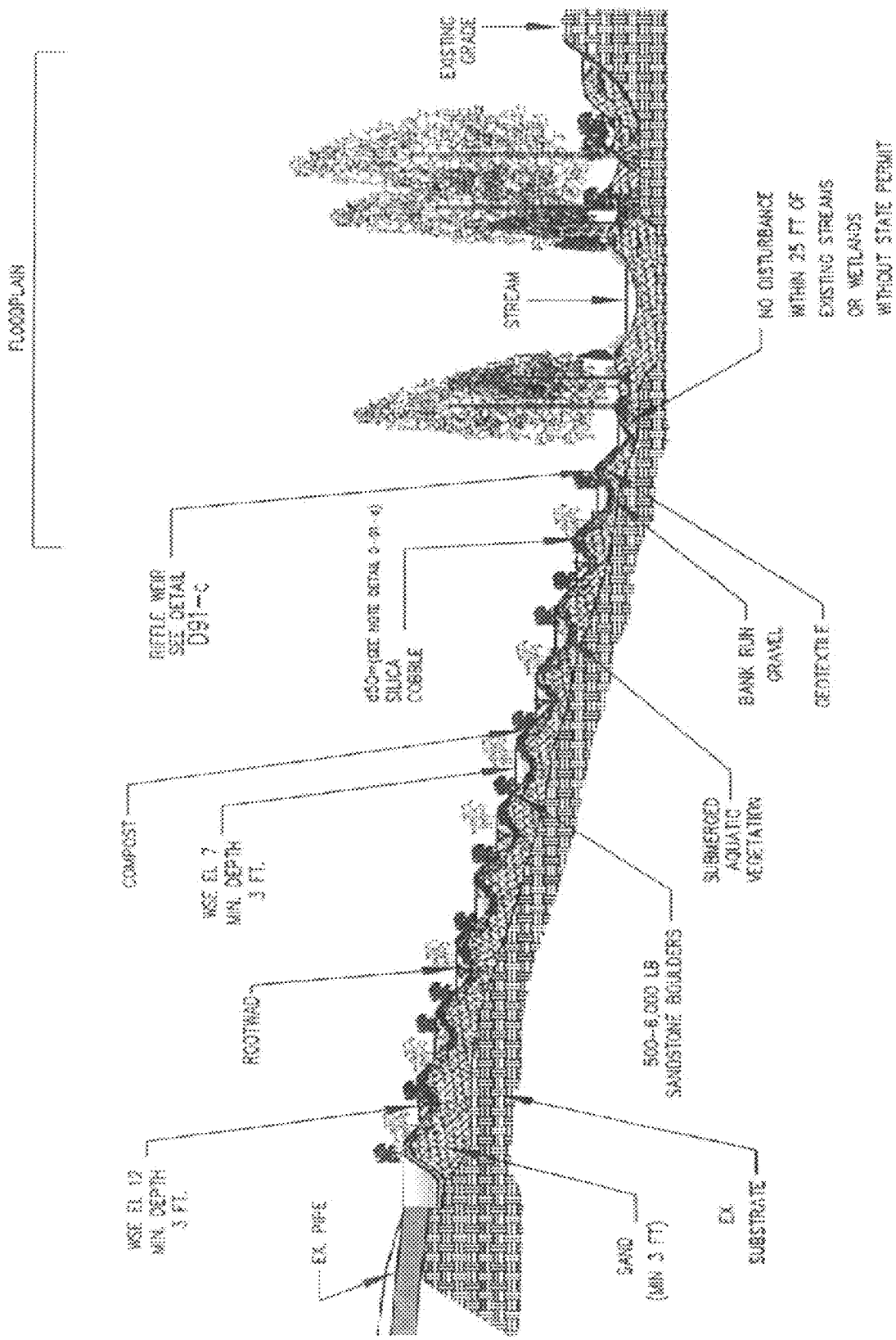
FIG. 3 is a side view of the regenerative stormwater conveyance system in accordance with a further embodiment of the present invention.

Referring to FIGS. 2A and 2B, a complete RSC system 100 in accordance with an exemplary embodiment of the present invention is shown. In particular, stormwater enters entry pool 10 via a pipe (not shown) or some other structure, such as a culvert. As water overflows the entry pool 10, it enters a series of riffle weir grade control structures 20 and collects in an outlet pool 30. The number of riffle weir grade control structures 20 and the structure thereof is determined using the method described above in reference to FIG. 1.

Figure 4:
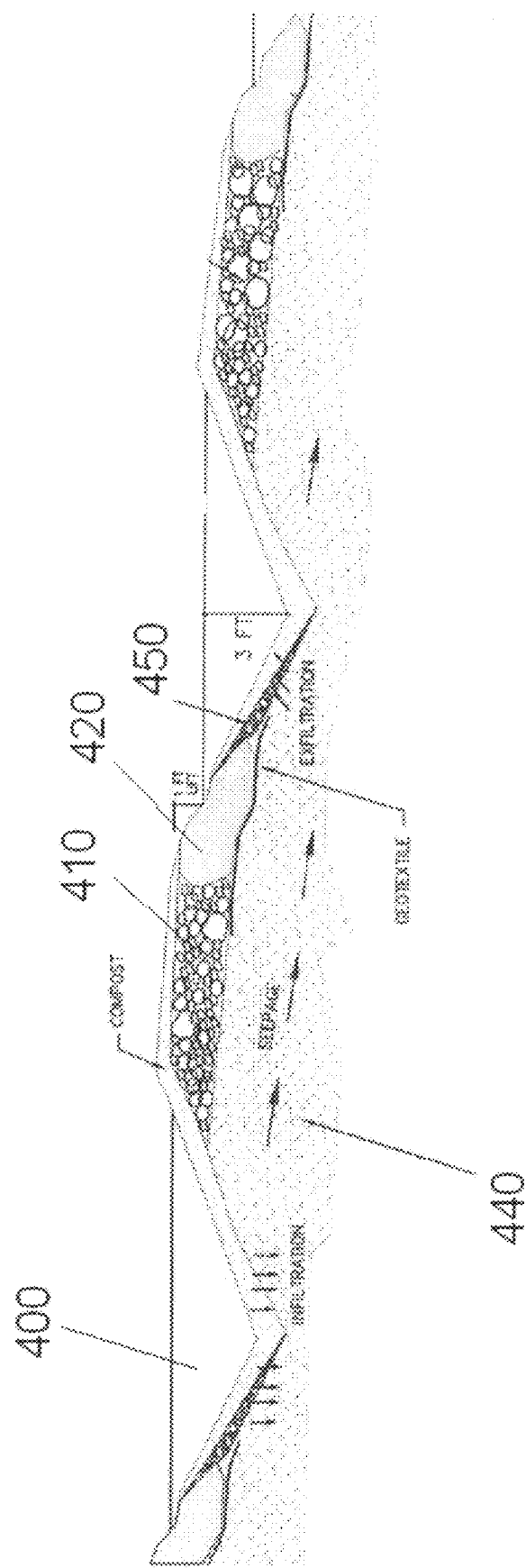
FIG. 4 is a close-up side view of an exemplary embodiment of a riffle weir grade control structure used in a regenerative stormwater conveyance system in accordance with the present invention.

As shown, for example in FIG. 4, a riffle weir grade control structure in accordance with this embodiment includes a shallow pool 400, a cobble section 410 and a boulder section 420. Each shallow pool 400 is approximately 3 feet deep at its deepest point and gets gradually more shallow as it nears the cobble section of the next downstream riffle weir grade control structure. Further, each pool 400 collects and temporarily stores water at its respective grade, or elevation, as overflowing water from the entry pool cascades through the series of riffle weir grade control structures 20. As water sits in each pool 400, it gradually filters through a compost bed 430 into a sand base 440.

Each pool 400 is separated by the cobble and boulder sections, 410 and 420, respectively, of the adjacent riffle weir grade control structure. As shown in FIG. 4, as water overflows the top of each pool 400, it travels over the upper portion of compost bed 430 which is supported beneath by cobble section 410, comprised of, for example, silica cobble. Supporting the cobble section 430 in the downstream direction is its respective boulder section 420, which keeps the silica cobble from eroding or otherwise shifting downstream under the pressure of the overflowing water from pool 400. Boulder section 420 comprises, for example, one or more 500-6000 pound sandstone boulders. Optional geotextile material 425 is placed under boulder section 420 to allow water to filter into the sand base 440 beneath boulder section 420 while preventing the soil from moving and, thus, potentially permitting the boulder(s) to shift.

Water traveling over cobble section 410 cascades over boulder section 420 and into the next downstream pool 400. In part to hold boulder section 420 in place against downstream forces, a cobble apron 450 is placed on the downstream side of boulder section 420. Water seeping through sand base 440 from upstream pools 400 exfiltrates through cobble apron 450 and enters the downstream pool. As shown, each riffle weir grade control structure enables water to gradually traverse a downward grade while filtering the water collected in each pool 400.

FIG. 5A is a cross section elevation front view of an exemplary embodiment of a riffle weir used in a regenerative stormwater conveyance system in accordance with the present invention.

Figure 5B:
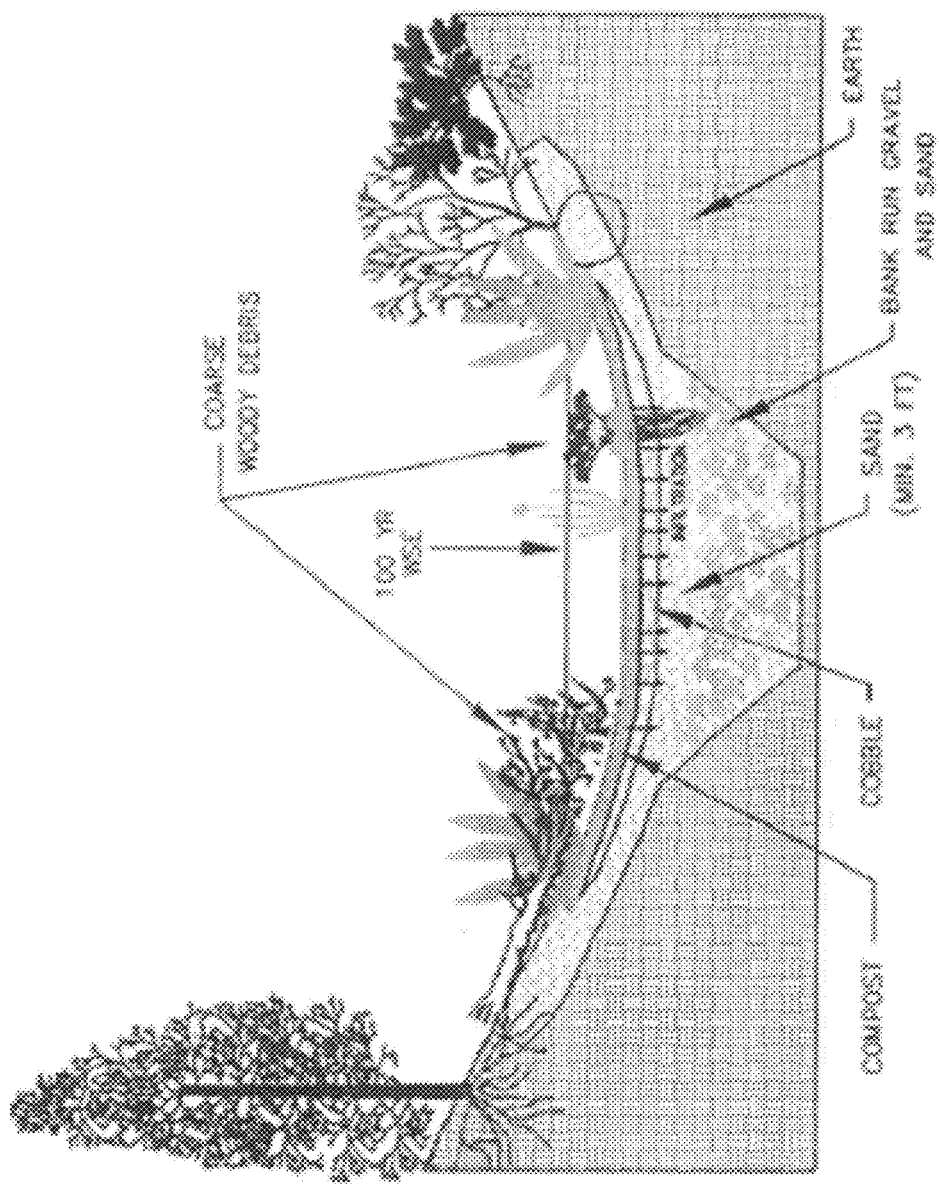
FIG. 5B is a cross section elevation back view of an exemplary embodiment of a riffle weir used in a regenerative stormwater conveyance system in accordance with the present invention.

FIG. 5B is a cross section elevation back view of an exemplary embodiment of a riffle weir used in a regenerative stormwater conveyance system in accordance with the present invention.

Figure 6A:
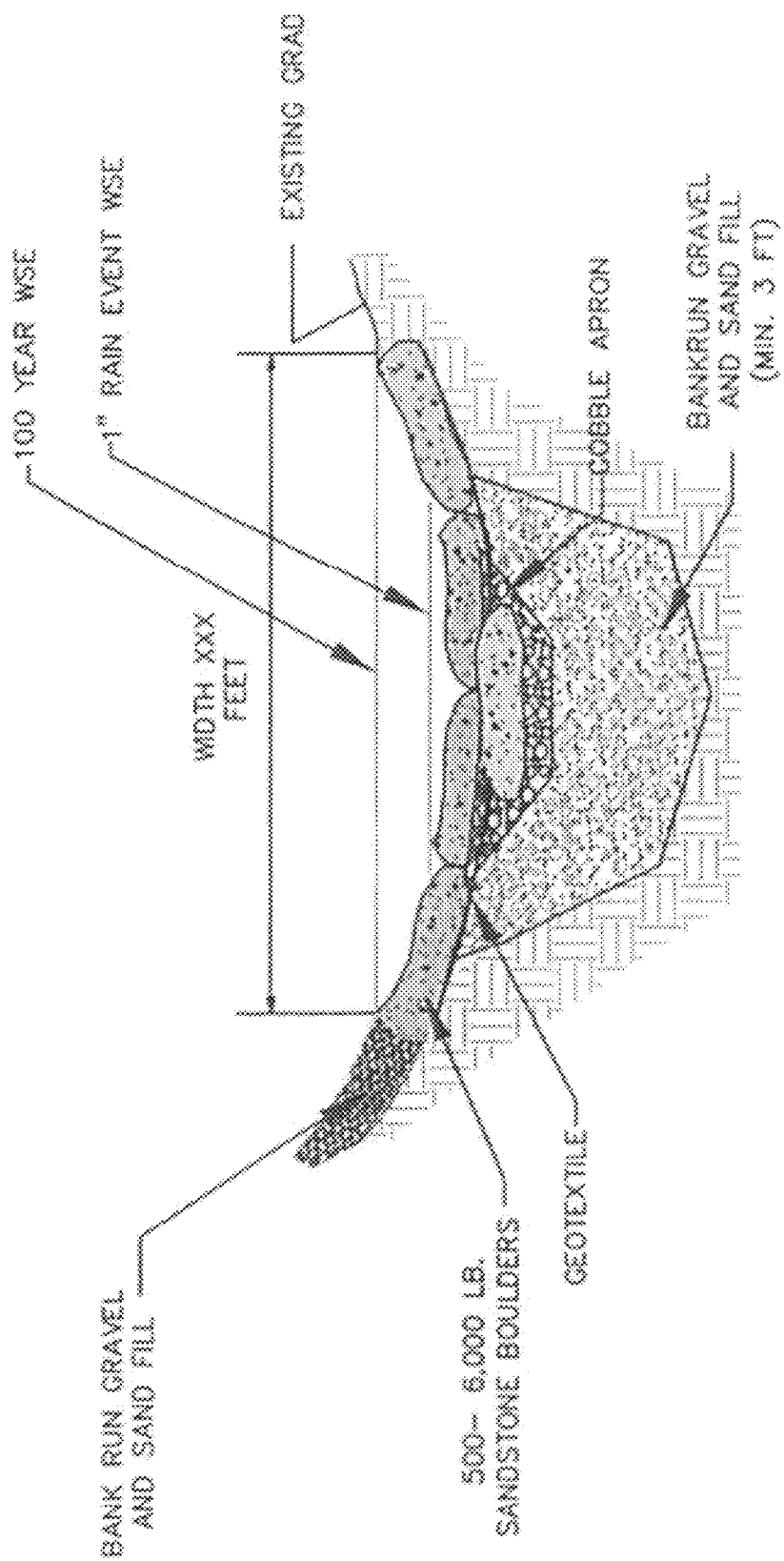
FIG. 6A is a cross section view of a boulder section of an exemplary embodiment of a riffle weir grade control structure used in a regenerative stormwater conveyance system in accordance with the present invention. For example, as provided in the Udden-Wentworth scale, rocks or stones having a diameter greater than 256 mm are classified as "boulders."
Figure 6B:
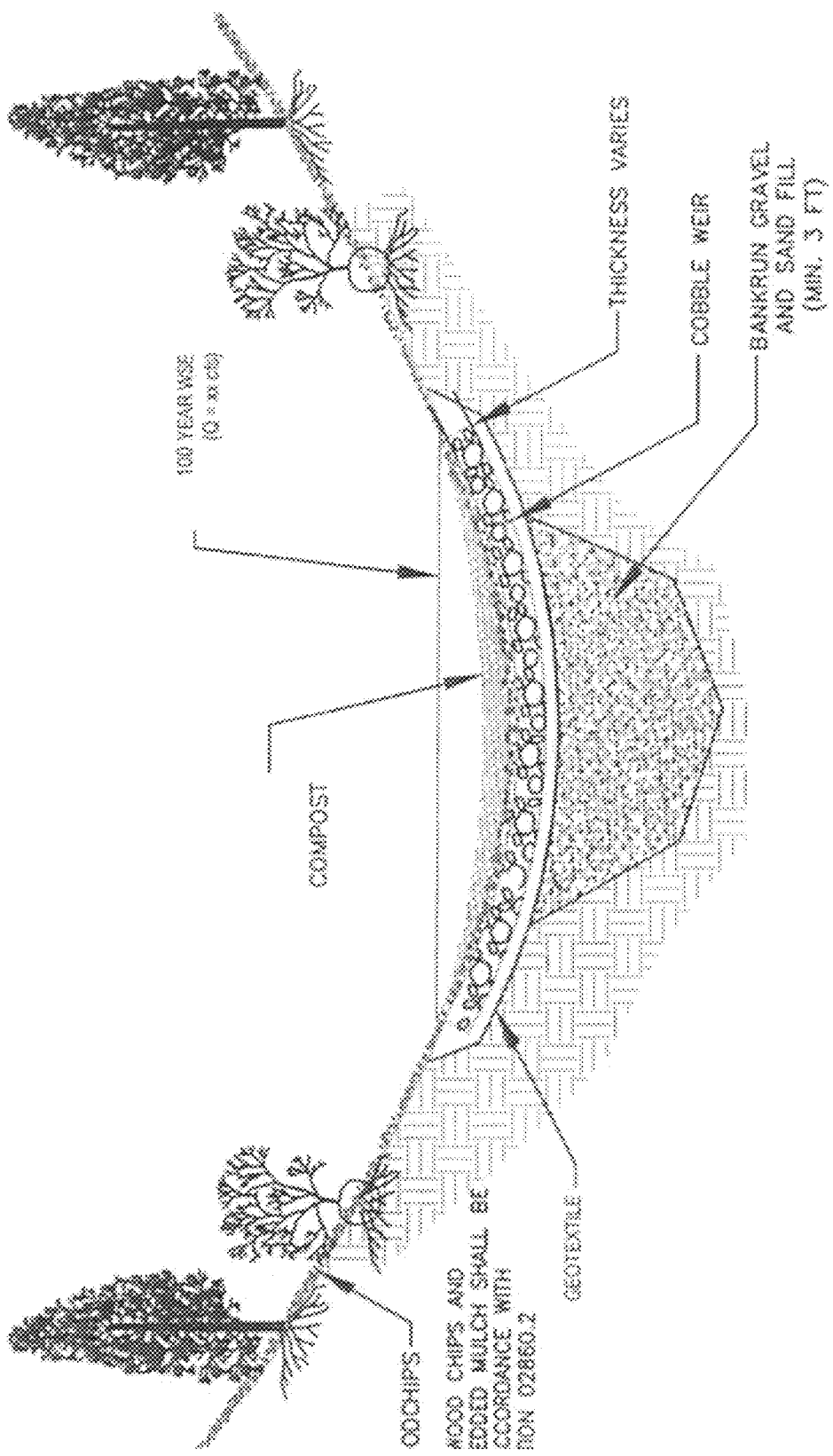
FIG. 6B is a cross section view of a weir cobble section of an exemplary embodiment of a riffle weir grade control structure used in a regenerative stormwater conveyance system in accordance with the present invention. For example, as provided in the Udden-Wentworth scale, rocks or stones having a diameter in the range of 64-256 mm are classified as "cobbles."

FIG. 6A is a cross section view of the boulder section 420 of the present exemplary embodiment and FIG. 6B is a cross section view of the cobble section 410 of the present exemplary embodiment. The geotextile material used in accordance with the present embodiment is ASTM D-4833 or ASTM D-463. The geotextile material is placed over the prepared surface of the excavation/fill and is anchored in place using appropriate pins or other appropriate means. Where fabric overlaps are necessary, the minimum overlap should be at least approximately 12 inches. However, a bit more or less overlap is adequate. According to this embodiment it is not necessary to put geotextile material under the cobble section 410, but this is desirable where possible.

Figure 7:
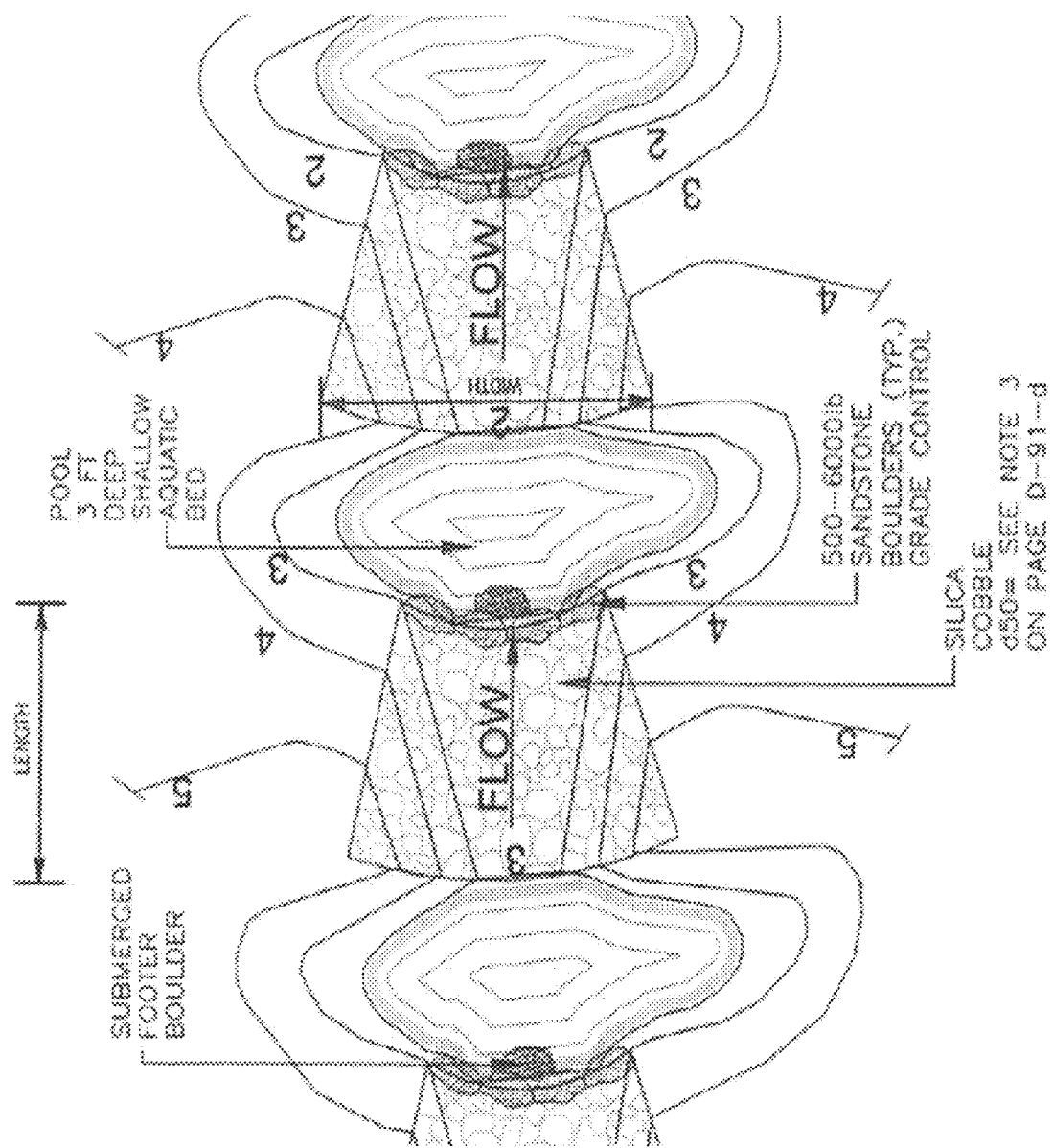
FIG. 7 is a close-up top view of an exemplary embodiment of a riffle weir grade control structure used in a regenerative stormwater conveyance system in accordance with the present invention.

FIG. 7 is a close-up top view of the present exemplary embodiment of a riffle weir grade control structure. In accordance with this embodiment, the boulders used to construct boulder section 420 include a footer boulder 421 positioned at the base of the boulder section 420. Each boulder is an individual sandstone boulder having a length of between 2 and 6 feet. Further, according to this embodiment, not more than 10 percent of the total weight of boulders is smaller than 15 inches in diameter.

With respect to the cobble section 410, the cobble is composed of a well-graded mixture of stone size so that 50 percent of the pieces, by weight, is larger than the d50 size determined, for example in accordance with the method described above in reference to FIG. 1. A well-graded mixture is defined for purposes of this description as a mixture composed primarily of larger stone sizes but with a sufficient mixture of other sized stones to fill the small voids between the larger stones. The diameter of the largest stone size in such a mixture is approximately 1.5 times the d50 size, for example, 8-inches×1.5=12-inches.

Figure 8:
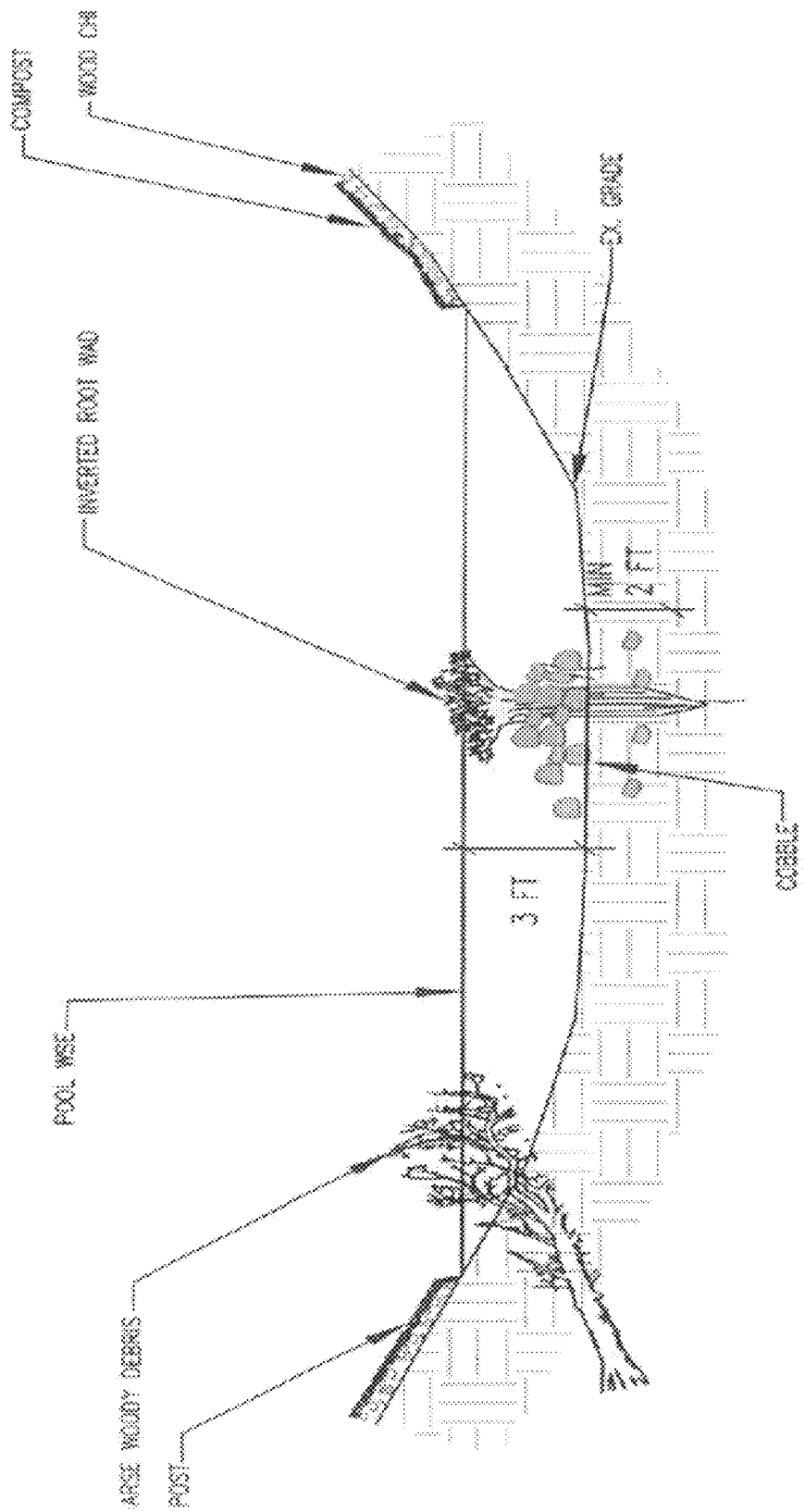
FIG. 8 is a cross section side view of an exemplary embodiment of a shallow pool used in a regenerative stormwater conveyance system in accordance with the present invention.
Figure 9:
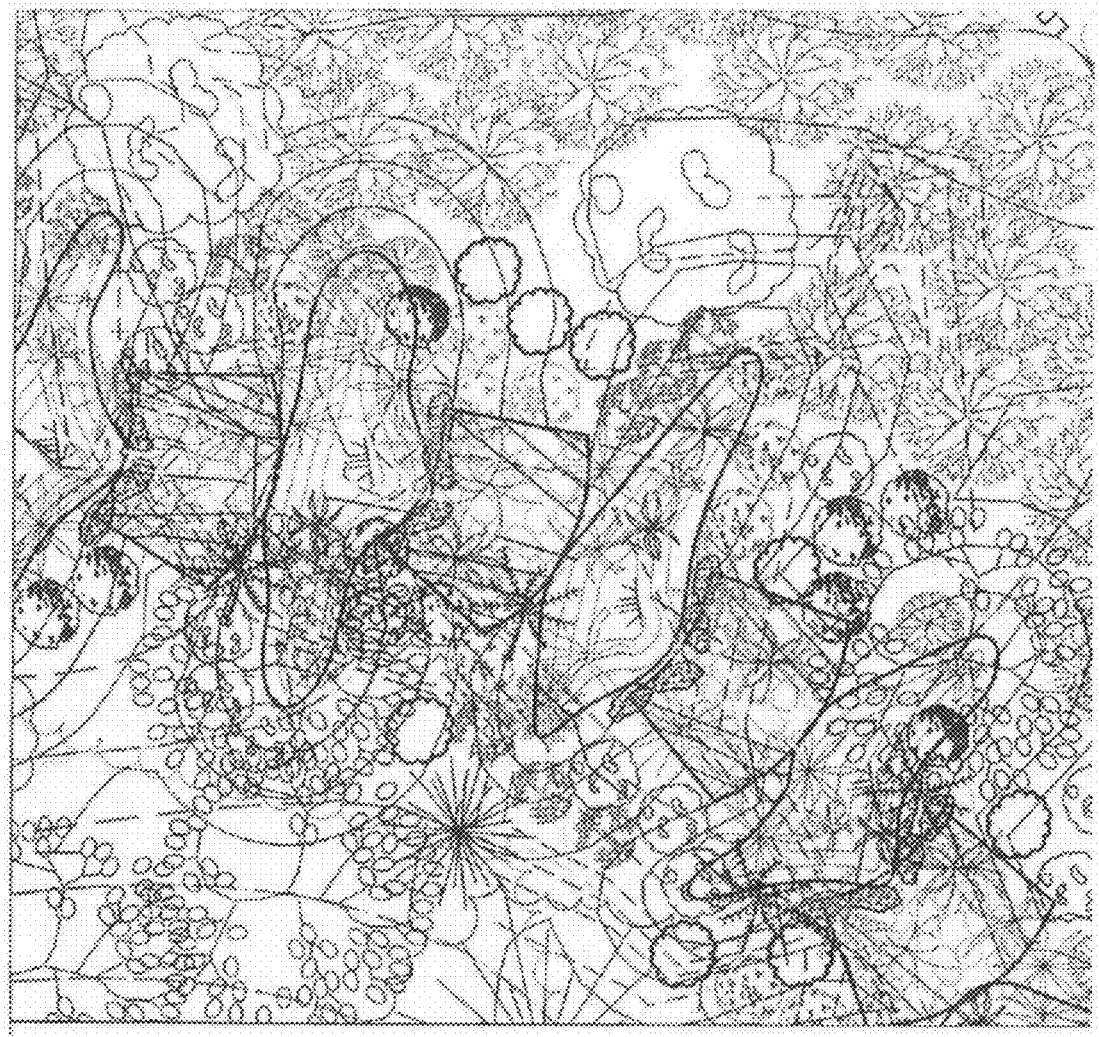
FIG. 9 is a design plan view of an exemplary embodiment of a regenerative stormwater conveyance system in accordance with the present invention.
Figure 9:
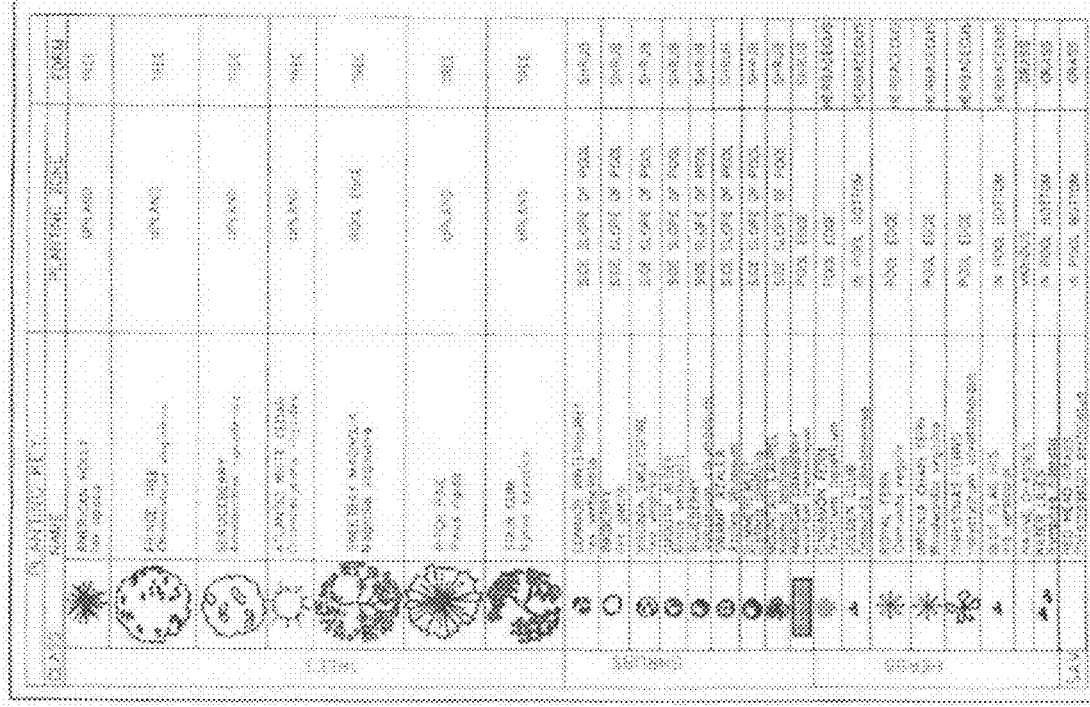
Figure 10:
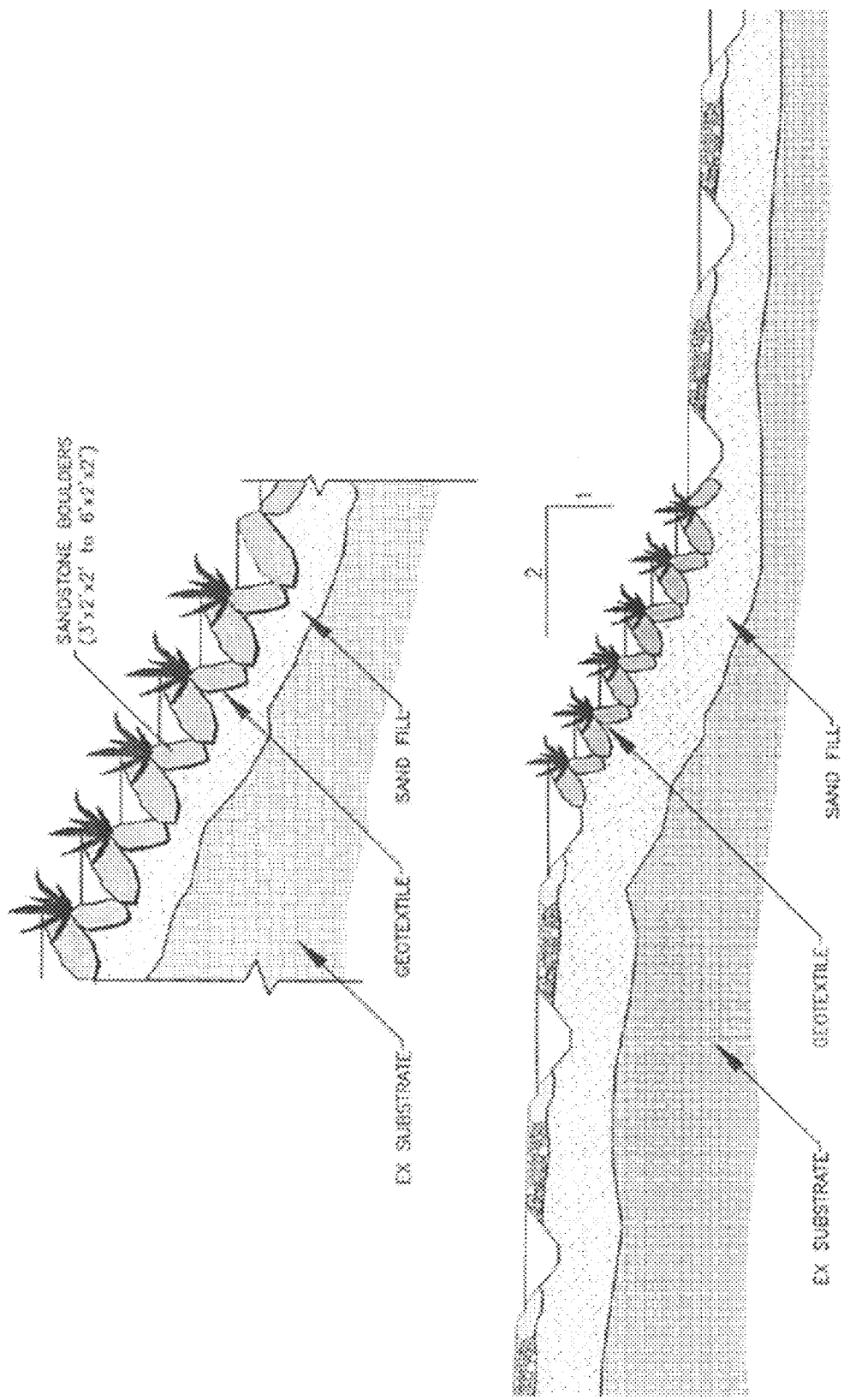
FIG. 10 is a cross section side view of an exemplary embodiment of riffle weir grade control structure used in a regenerative stormwater conveyance system in accordance with a further embodiment of the present invention.

FIG. 8 is a cross section side view of a shallow pool 400 in accordance with the present embodiment. As shown, inverted root wad 800 is placed at the approximate center of the pool. Inverted root wads consist of a root fan and trunk of a tree with a trunk diameter at breast height of 8 to 24 inches. Root fans according to this embodiment are oblong to circular in shape and have a minimum area of 16 square feet. The attached trunk is a minimum of 5 feet in length. To place the root wad in its desired position, the trunk is sharpened, in similar fashion to sharpening a pencil, and driven into the soil at the desired position with the root mass facing upward in the shallow pool 400.

Compost 850 shown in FIG. 8 has a pH between 5.0 and 7.0 and is stable, e.g., does not reheat upon stacking. Further, the compost has a moisture content of between 30 and 55 percent and a particle size of 0.5-inches or less. For example, compost 450 is either tree leaf compost or non-tree leaf compost, such as lawn clippings.

A system according to the present invention restores ecological diversity in a manner not recognized by conventional methods. These techniques consistently result in far better stormwater treatment and wetland creation and stormwater management than do conventional approaches. A system in accordance with the invention, further, represents a unique opportunity to engage the community and to involve it in helping to restore threatened plant species to the human-shaped landscape. Finally, economic analyses of these methods have shown that they consistently return several times more value to the entities implementing them than they cost to design and build. The value of the stormwater management and wetland creation, stream restoration, and water storage has generally ranged from 3 to 8 times greater than the cost to get the project in the ground.

As has been mentioned throughout, the present stormwater management invention can be used in combination with other stream and wetland restoration applications, such as the one described in copending application Ser. No. 11/482,891, titled Sand Seepage Stream and Wetland Restoration System and Method for Ecological Restoration.

The inventive system can also replace conventional stormwater outfalls from culverts or pipes. It can be used in "rain garden" type applications alongside buildings or in highway medians to safely convey, detain, and infiltrate stormwater runoff from impervious surfaces. Systems according to the invention represent an ideal opportunity to move away from conventional stormwater holding ponds and towards sites that provide extensive stormwater attenuation, community benefit, and vital habitat. In instances where man-made structures (e.g. dams) or natural processes have caused blockages to fish migration, these systems can be used to restore fish passage and restore habitat. Finally, each of these instances where these methods are applied represents an ideal opportunity to participate in the restoration of rare, threatened, and endangered plant species populations that are often found in these peatland habitats.

The exemplary and alternative embodiments and their constituent components described above may be combined and/or modified in a variety of ways and remain consistent with the intended functionality of the invention. Furthermore, the steps and number of the various steps illustrated in the figures, specifically FIG. 1, may be adjusted from that shown without straying from the spirit of the invention.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

What is claimed is:

1. A regenerative stormwater conveyance system for treating and dispersing stormwater runoff, the system comprising:
   an entry point from which water enters the system;
   an entry pool operable to collect water entering from the entry point, said entry pool being located at an upstream point in said system;
   a first aquatic bed having a filtration structure operable to filter water; and
   a first riffle weir grade control structure operable to transition overflow water from said entry pool to said first aquatic bed, wherein said first aquatic bed is lower than said entry pool; and
   a sand base disposed beneath at least the filtration structure and operable to carry filtered water from the filtration structure downstream.

2. The regenerative stormwater conveyance system according to claim 1, wherein said first riffle weir grade control structure comprises:
   a boulder section; and
   a cobble section, wherein said cobble section is located upstream of said boulder section.

3. The regenerative stormwater conveyance system according to claim 2, wherein said boulder section comprises at least one boulder adjacent said first aquatic bed and said cobble section comprises a plurality of cobbles adjacent said at least one boulder portion, wherein the water from said entry pool runs over said cobbles and an upper portion of said boulder portion as it transitions from said entry pool to said first aquatic bed.

4. The regenerative stormwater conveyance system according to claim 2 further comprising a cobble apron having a plurality of cobbles disposed between said boulder section and the filtration structure.

5. The regenerative stormwater conveyance system according to claim 1, wherein said filtration structure comprises a layer of compost disposed at the bottom of said first aquatic bed.

6. The regenerative stormwater conveyance system according to claim 1, wherein said filtration structure includes a biomass.

7. The regenerative stormwater conveyance system according to claim 1, wherein said filtration structure includes one or more of a compost bed and a geotextile material.

8. A regenerative stormwater conveyance system comprising:
a plurality of aquatic beds each including a filtration structure operable to filter water from the respective aquatic bed and a sand base disposed beneath the filtration structure, wherein said filtration structure includes compost;
at least one riffle weir grade control structure disposed respectively between each of said plurality of aquatic beds and operable to transfer water overflowing from an upstream aquatic bed to a downstream aquatic bed, wherein the downstream aquatic bed is at a lower grade than the upstream aquatic bed.

9. The regenerative stormwater conveyance system according to claim 8, wherein a at least one of said riffle weir grade control structures is wider at a location adjacent its respective upstream aquatic bed than it is at a location adjacent its respective downstream aquatic bed.

10. The regenerative stormwater conveyance system according to claim 8, wherein each of said riffle weir grade control structures comprises a cobble section including a plurality of cobbles at an upstream side and a boulder section including a plurality of boulders at a downstream side and having a sheet of geotextile material disposed beneath one or more of said plurality of boulders.

11. The regenerative stormwater conveyance system according to claim 10, wherein at least one of the boulders is a sandstone boulder and weights between 500 and 6000 pounds.

12. The regenerative stormwater conveyance system according to claim 10, wherein the plurality of cobbles comprises silica cobbles.

13. A method of designing a regenerative stormwater conveyance (RSC) system, the method comprising:
determining the volume of water for storage;
mapping out the reach where the RSC will be placed in the landscape;
determining the length of the reach from an input point to a discharge point;
determining the elevation difference of the reach as the difference between the top of the reach and the bottom of the reach; and
setting a number of riffle weir grade control structures to be constructed in the system to the elevation difference of the reach.

14. The method of designing a RSC system as claimed in claim 13, further comprising:
setting the length of the riffle weir grade control structure (s) to be half the ratio of the length of the reach to the elevation difference of the reach; and
determining the width and depth of the riffle weir grade control structure(s).

15. The method of designing a RSC system as claimed in claim 14, wherein said determining the width and depth of the riffle weir grade control structure(s) comprises:
designing the weirs to carry the 100 year storm flow in a parabolic shape; and
setting the minimum freeboard for waterways and outlets of the weirs to be approximately 0.25 ft. above a high water location.

16. The method recited in claim 15 further comprising:
setting a minimum width of at least one of said riffle weir grade control structures to be 14 feet, wherein width is the dimension of said at least one riffle weir grade control structure that is perpendicular to a flow of said water.

17. The method of constructing a regenerative stormwater conveyance system, the method comprising:
determining an entry point from which water enters the system;
forming an entry pool operable to collect water entering from the entry point;
forming a first aquatic bed lower in elevation than said entry point and including a filtration structure operable to filter water; and
forming a first riffle weir grade control structure between said entry point and said first aquatic bed; and
providing a sand base disposed beneath at least the filtration structure and operable to carry filtered water from the filtration structure.

18. A regenerative stormwater conveyance system for treating and dispersing stormwater runoff, the system comprising:
an entry point from which water enters the system;
an entry pool operable to collect water entering from the entry point, said entry pool being located at an upstream point in said system;
a first aquatic bed having a filtration structure operable to filter water; and
a first riffle weir grade control structure operable to transition overflow water from said entry pool to said first aquatic bed, wherein a water level within said first aquatic bed is lower than a water level within said entry pool; and
sand seepage beds having above and below-ground biomass.

* * * * *

UNITED STATES PATENT AND TRADEMARK OFFICE
CERTIFICATE OF CORRECTION

| | |
|---|---|
| PATENT NO. | : 11,047,125 B2 |
| APPLICATION NO. | : 12/292642 |
| DATED | : June 29, 2021 |
| INVENTOR(S) | : Underwood |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this
Twentieth Day of December, 2022

Katherine Kelly Vidal
*Director of the United States Patent and Trademark Office*